United States Patent
Lee et al.

(10) Patent No.: US 12,549,994 B2
(45) Date of Patent: Feb. 10, 2026

(54) ELECTRONIC DEVICE FOR CONTROLLING E2 TERMINATION BASED ON TRAFFIC INFORMATION OF THE E2 TERMINATION AND METHOD FOR THE SAME

(71) Applicant: SAMSUNG ELECTRONICS CO., LTD., Suwon-si (KR)

(72) Inventors: Minha Lee, Suwon-si (KR); Hoejoo Lee, Suwon-si (KR); Myeonggi Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 60 days.

(21) Appl. No.: 17/944,831

(22) Filed: Sep. 14, 2022

(65) Prior Publication Data
US 2023/0054483 A1    Feb. 23, 2023

Related U.S. Application Data

(63) Continuation of application No. PCT/KR2022/008655, filed on Jun. 17, 2022.

(30) Foreign Application Priority Data

Aug. 19, 2021   (KR) .................. 10-2021-0109234

(51) Int. Cl.
*H04W 28/02*   (2009.01)
*H04L 47/2475* (2022.01)
*H04W 76/19*   (2018.01)

(52) U.S. Cl.
CPC ..... *H04W 28/0215* (2013.01); *H04L 47/2475* (2013.01); *H04W 76/19* (2018.02)

(58) Field of Classification Search
CPC .............. H04W 28/0215; H04W 76/19; H04L 47/2475

(Continued)

(56) References Cited

U.S. PATENT DOCUMENTS 10,374,908 B2   8/2019   Mihaly et al.
10,674,395 B2   6/2020   Mukherjee et al.
(Continued)

FOREIGN PATENT DOCUMENTS

CN   111698730    9/2020
EP   3 320 652    8/2019
(Continued)

OTHER PUBLICATIONS

Search Report and Written Opinion dated Sep. 15, 2022 issued in International Patent Application No. PCT/KR2022/008655.
(Continued)

*Primary Examiner* — Hermon Asres
(74) *Attorney, Agent, or Firm* — Nixon & Vanderhye, P.C.

(57) ABSTRACT

In an electronic device and an operating method of the electronic device according to various embodiments, the electronic device may include: a radio access network (RAN) intelligent controller (RIC) connected to at least one E2 node. The RIC may include: an application, a plurality of E2 terminations connected between the at least one node and the application, and a traffic controller. The traffic controller may be configured to: receive a subscription request for the node from the application, select an E2 termination to be used for the application to perform subscription among the plurality of E2 terminations based on traffic information of data transmitted or received through the E2 termination, and control the application to receive data through the E2 node, through the selected E2 termination.

19 Claims, 10 Drawing Sheets

(58) Field of Classification Search
USPC .......................................................... 709/223
See application file for complete search history.

(56) References Cited

U.S. PATENT DOCUMENTS

| | | | |
|---|---|---|---|
| 10,904,794 | B2 | 1/2021 | Farmanbar et al. |
| 2015/0065148 | A1 | 3/2015 | De Pasquale et al. |
| 2021/0184989 | A1* | 6/2021 | Wu .................. H04L 47/762 |
| 2021/0234803 | A1 | 7/2021 | Parekh et al. |
| 2022/0225264 | A1 | 7/2022 | Song et al. |
| 2022/0279498 | A1 | 9/2022 | Song et al. |
| 2022/0286837 | A1* | 9/2022 | Yang ................ H04W 28/0865 |
| 2023/0054483 | A1* | 2/2023 | Lee .................. H04L 47/2475 |
| 2023/0133083 | A1* | 5/2023 | Song ................. H04W 8/20 |
| | | | 455/435.1 |

FOREIGN PATENT DOCUMENTS

| | | |
|---|---|---|
| EP | 3855843 | 7/2021 |
| KR | 10-2021-0039310 | 4/2021 |
| WO | 2021/101355 | 5/2021 |
| WO | WO 2021/252443 * 12/2021 .............. H04W 8/18 |
| WO | WO-2021252443 A1 * 12/2021 .............. H04W 8/18 |

OTHER PUBLICATIONS

Czichy, "5G RAN optimization using the O-RAN software community's RIC (RAN Intelligent Controller)", https://wiki.o-ran-sc.org/download/attachments/10715420/Near_RT_RIC_for_ONS.pdf, Sep. 23, 2019, 24 pages.

Lee et al., "Hosting AI/ML Workflows on O-RAN RIC Platform", Published in: 2020 IEEE Globecom Workshops, Mar. 5, 2021, 8 pages.

Extended Search Report dated Sep. 25, 2024 in European Patent Application No. 22858589.9.

Leonardo Bonati et al: "Intelligence and Learning in O-RAN for Data-driven NextG Cellular Networks", arXiv:2012.01263v2 [cs.NI], Jul. 21, 2021 (7 pages).

Anonymous: "O-RAN Working Group 3, Near-Real-time RAN Intelligent Controller, Near-RT RIC Architecture", Technical Specification O-RAN Alliance, O-RAN.WG3.RICARCH-v01.01, 2020, 23 pages.

* cited by examiner

ELECTRONIC DEVICE FOR CONTROLLING E2 TERMINATION BASED ON TRAFFIC INFORMATION OF THE E2 TERMINATION AND METHOD FOR THE SAME

CROSS-REFERENCE TO RELATED APPLICATIONS

This application is a continuation of International Application No. PCT/KR2022/008655 designating the United States, filed on Jun. 17, 2022, in the Korean Intellectual Property Receiving Office and claiming priority to Korean Patent Application No. 10-2021-0109234, filed on Aug. 19, 2021, in the Korean Intellectual Property Office, the disclosures of which are incorporated by reference herein in their entireties.

BACKGROUND

Field

The disclosure relates to an electronic device and an operating method of the electronic device and to a technology for controlling an E2 termination of an open RAN system

Description of Related Art

In order to satisfy wireless data traffic demands that tend to increase after 4G communication system commercialization, efforts to develop an enhanced 5G communication system or a pre-5G communication system are being made. For this reason, the 5G communication system or pre-5G communication system is called a beyond 4G network communication system or a post LTE system. In order to achieve a high data transfer rate, an implementation of the 5G communication system in an mmWave band (e.g., 6 GHz or more band) in addition to the band (6 GHz or less band) used in LTE is also taken into consideration. In the 5G communication system, technologies, such as beamforming, massive MIMO, full dimensional MIMO (FD-MIMO), an array antenna, analog beamforming and large scale antenna technologies, are being discussed.

A base station providing mobile communication services is implemented in an integrated form in which a data processing unit (a digital unit or a distributed unit (DU)) and wireless transceiver (radio unit or remote unit (RU)) of a base station are together installed in a cell site. However, the base station implemented in the integrated form of the DU and the RU is not suitable for the needs of a mobile communication operator attempting to construct multiple cell sites according to an increase in users and traffic. Accordingly, a centralized radio access network (C-RAN) (or a cloud RAN) structure for improving such incompatibility has emerged.

The C-RAN has a structure in which the DUs are intensively disposed at one physical place and only the RU is left in a cell site that actually transmits and receives radio signals to and from a terminal. The DU and the RU may be connected through an optical cable or a coaxial cable. Furthermore, as the RU and the DU are separated from each other, an interface standard for communication between the RU and the DU becomes necessary. A standard, such as a common public radio interface (CPRI), is currently used between the RU and the DU.

Furthermore, even in the 3rd generation partnership project (3GPP), such a base station structure is being standardized. An open radio access network (O-RAN), that is, an open network standard which may be applied to a 5G system is researched.

An O-RAN system may refer to a network system implemented based on an O-RAN standard in which functions capable of being performed by a base station (eNB) of the existing 4G mobile communication system and a base station (gNB) of a 5G mobile communication system are logically separated and implemented. The O-RAN system may include a RAN intelligent controller (RIC) for performing various types of management including resource allocation between the base station and a core network. The RIC is an element for improving quality of service used by a user equipment (UE), and may provide optimal cellular communication to the UE through the optimization of elements and resources of the O-RAN system.

An RIC may include an application capable of performing various functions. The application may perform a subscription procedure of receiving data transmitted by a node of an O-RAN system in order to perform various functions. The RIC may receive data from the node through an E2 termination that refers to the termination of an E2 interface, and may provide the received data to the application.

However, as the number of nodes connected to the RIC is increased, a load of the E2 termination may be increased because the size of data traffic of the E2 termination is increased. An electronic device may implement a plurality of E2 terminations in order to reduce a load of an E2 termination.

However, as the number of E2 terminations implemented on the electronic device is increased, the number of data transmission paths between the E2 termination and the application may be increased. When the number of data transmission paths is increased, the size of data traffic of the electronic device may be increased, and a phenomenon in which the stability of data reception is reduced may occur.

SUMMARY

An electronic device according to various example embodiments of the present disclosure may include: a radio access network (RAN) intelligent controller (RIC) connected to at least one E2 node. The RIC may include: an application, a plurality of E2 terminations connected between the at least one node and the application, and a traffic controller. The traffic controller may be configured to: receive a subscription request for the node from the application, select an E2 termination to be used for the application to perform subscription among the plurality of E2 terminations based on traffic information of data transmitted or received through the E2 termination, and control the application to receive data through the E2 node, through the selected E2 termination.

A method of operating the electronic device according to various example embodiments of the present disclosure may include: receiving, by a traffic controller of a radio access network (RAN) intelligent controller (RIC), a subscription request for an E2 node from an application included in the RIC, selecting, by the traffic controller, an E2 termination to be used for the application to perform subscription among the plurality of E2 terminations based on traffic information of data transmitted or received through the E2 termination, and controlling, by the traffic controller, the application to receive data through the E2 node, through the selected E2 termination.

The electronic device and an operating method of the electronic device according to various example embodiments of the present disclosure can select an E2 termination to be connected to an application that has performed a subscription request based on the size of traffic to be generated by the application that has performed the subscription request and the size of traffic which occurs or is to occur in the E2 termination, and can connect the E2 termination and an E2 node. Accordingly, the electronic device can prevent and/or reduce overload of some E2 terminations and improve the stability of data reception by properly distributing loads of a plurality of E2 terminations.

The electronic device and an operating method of the electronic device according to various example embodiments of the present disclosure can control nodes transmitting the same data type to be connected to the same E2 termination. Accordingly, the electronic device can improve the stability of data reception by reducing the number of data transmission paths within the electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
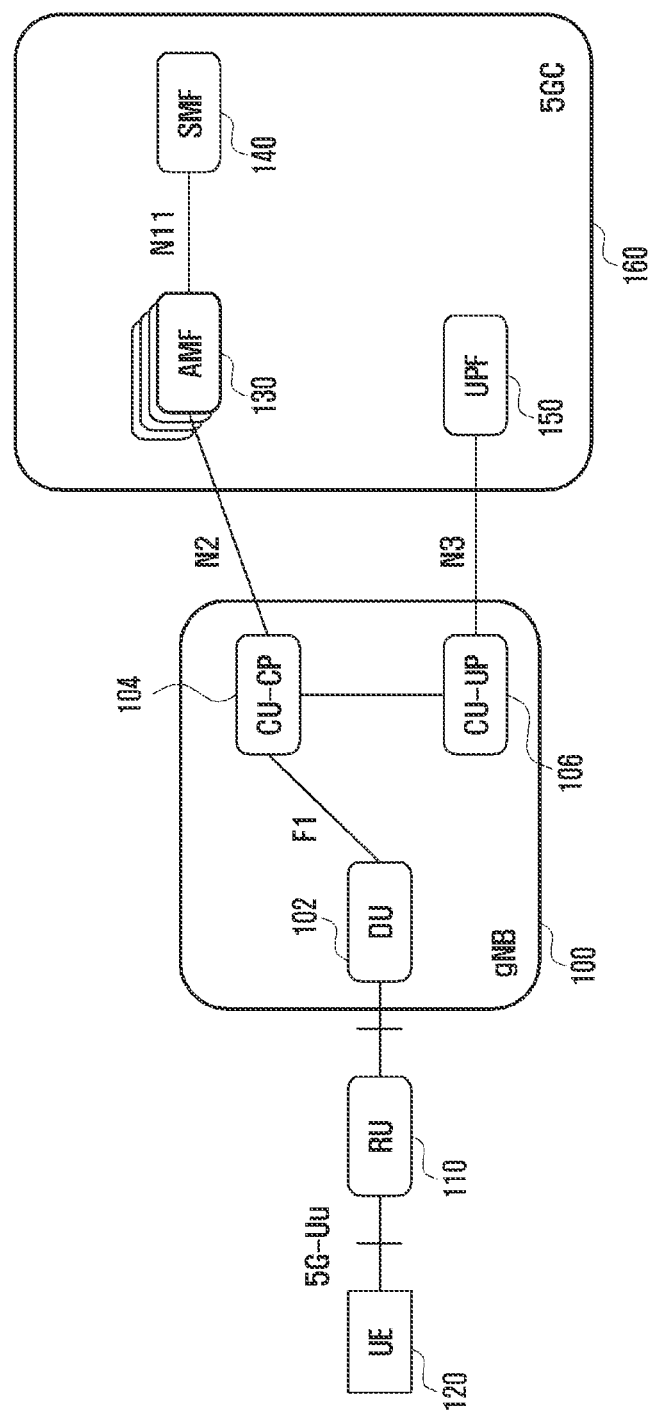
FIG. 1 is a diagram illustrating an example of a 5G NR core system according to various embodiments.

FIG. 1 is a diagram illustrating an example of a 5G NR core system according to various embodiments.

FIG. 1 is a diagram of the 5G NR core system. A core network 160 may have a network function including an access and mobility management function (AMF) 130, a session management function (SMF) 140, and a user plane function (UPF) 150. The elements within the core network 160 may be elements implemented physically or as software, for example, including various circuitry and/or executable program instructions.

According to various embodiments of the present disclosure, the AMF 130 may provide a function for access and mobility management for each UE 120. The AMF 130 may perform a registration procedure on a cellular communication network of the UE 120, the mobility management (e.g., identify a location of the UE 120) of the UE 120, or connection management between the UE 120 and a cellular communication network.

According to various embodiments of the present disclosure, the SMF 140 may perform the establishment, modification or release of a session including a procedure for data transmission or reception between the UE 120 and the core network 160 or a session management operation including the assignment of an IP address to a UE.

According to various embodiments of the present disclosure, the UPF 150 may receive, through a base station 100, user data transmitted by the UE 120, and may transmit the received user data to an external server. The UPF 150 may transmit, to the UE 120, user data transmitted by the external server through the base station 100.

According to various embodiments of the present disclosure, the base station 100 (e.g., a base station (a generation Node B (gNB)) of a 5G mobile communication or a base station (an e-node B (eNB)) of a 4G mobile communication) may include at least one element of a radio unit (RU) 110 performing a physical layer function as a logical function, a digital unit (DU) 102 responsible for medium access control (MAC) and radio link control (RLC) functions, a central unit-control plane (CU-CP) 104 and a central unit-user plane (CU-UP) 106 responsible for higher functions, such as radio resource control (RRC) and a packet data convergence protocol (PDCP). The elements within the base station 100 may be elements implemented physically or as software.

According to various embodiments of the present disclosure, the CU-CP 104 may be an element performing a function related to a control plane. The CU-CP 104 may be an element performing functions related to connection setup between the UE 120 and the base station 100 and mobility and security of the UE 120.

According to various embodiments of the present disclosure, the CU-UP 104 may perform functions related to the data transmission and reception of a user as a function related to a user plane. The base station 100 may be connected to the AMF 130. At least one AMF 130 may be implemented on the core network 160.

Figure 2:
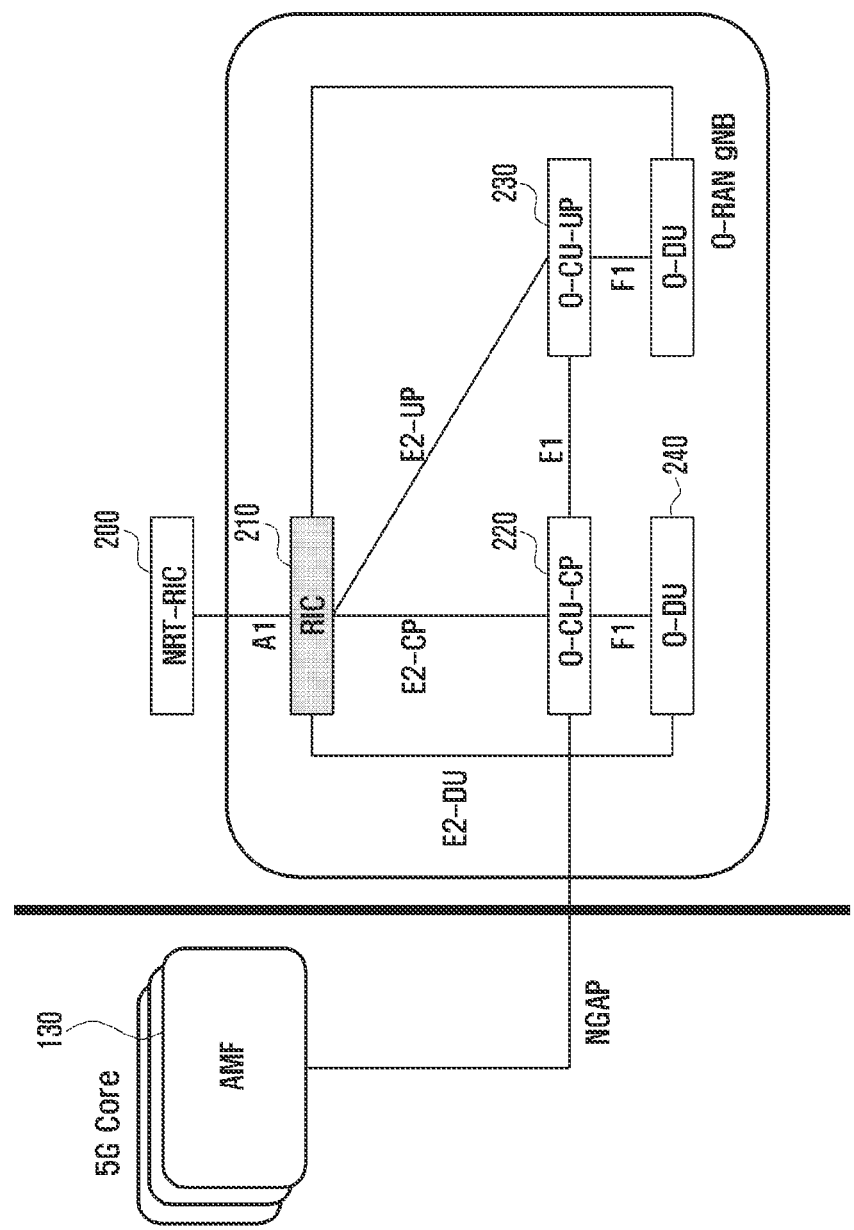
FIG. 2 is a diagram illustrating an example of an O-RAN network system according to various embodiments.

FIG. 2 is a diagram illustrating an example of an open radio access network (O-RAN) system according to various embodiments.

Referring to FIG. 2, O-RAN system may be a network system implemented based on an O-RAN standard in which functions capable of being performed by a base station (eNB) of the existing 4G mobile communication system and a base station (gNB) of a 5G mobile communication system are logically separated and implemented.

In the O-RAN standard, a non-real time RAN intelligent controller (NRT-RIC) 200, a (near-real-time) RAN intelligent controller (RIC) 210, an O-CU-CP 220, an O-CU-UP 230, an O-DU 240, etc. are newly defined.

The O-CU-CP 220 may be a logical element providing a function of a control plane part of RRC and a PDCP. The O-CU-UP 230 may be a logical element providing a function of a user plane part of an SDAP and a PDCP. The O-CU-CP 220 and/or the O-CU-UP 230 may be implemented as an O-CU, that is, an integrated element.

According to various embodiments of the present disclosure, the O-DU 240 may be a logical element providing a function of RLC, MAC, a higher physical layer (high-PHY) (this is based on a 7-2x fronthaul split). Although not illustrated in FIG. 2, an O-RU connected to the O-DU 240 may be a logical element providing a lower physical layer (low-PHY) (this is based on a 7-2x fronthaul split) function and RF processing (e.g., the amplification of a signal and/or the modulation of a signal).

According to various embodiments of the present disclosure, the NRT-RIC 200 may be a logical element that enables non-real-time control, the optimization of a RAN element and a resource, modeling training, an update, etc. The RIC 210 may be a logical element that enables near-real-time control and the optimization of a RAN element and a resource based on data collected from the O-DU 240, the O-CU-CP 220, or the O-CU-UP 230 through an E2 interface.

The present disclosure is not limited by the name of each described element. The present disclosure may be applied to a logical element performing the described function. Furthermore, the logical elements may be disposed physically at the same location or different locations, and functions thereof may be provided by the same physical device (e.g., a processor or a controller) or functions thereof may be provided by different physical devices. For example, one physical device may provide the function of the described at least one logical element through virtualization.

Figure 3:
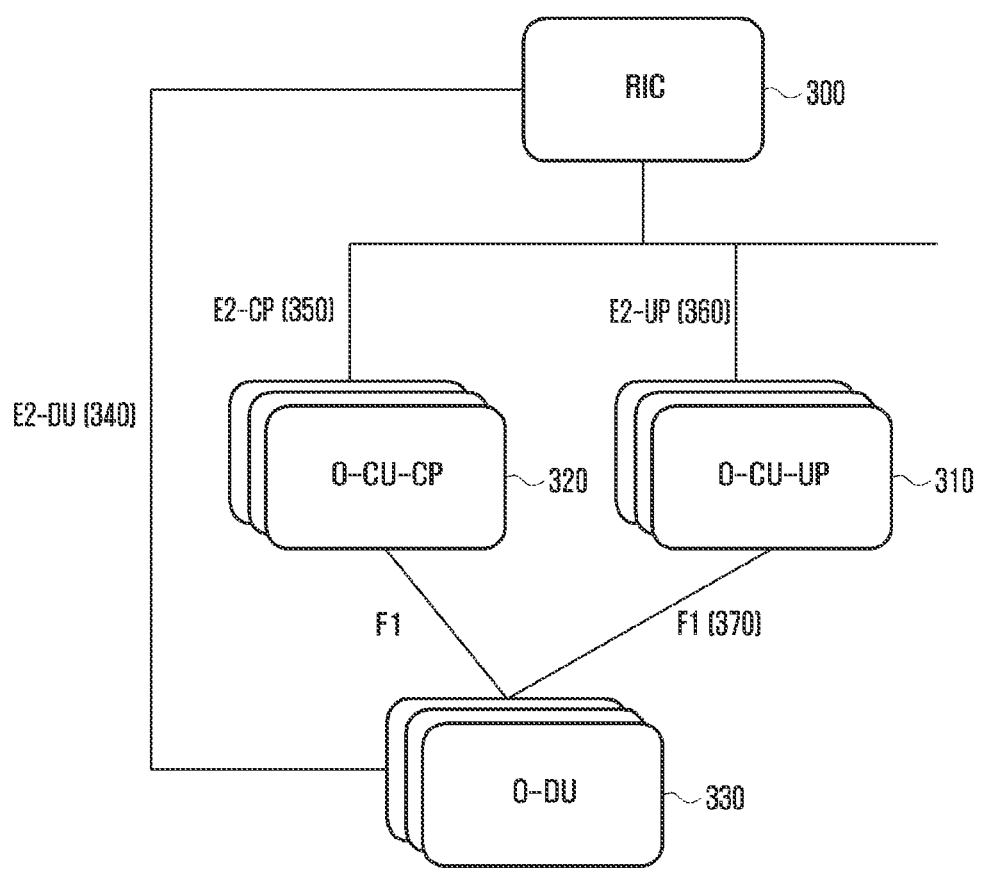
FIG. 3 is a diagram illustrating an example of a connection between an O-RAN RIC and multiple O-CU-CPs, O-CU-UPs, and O-DUs according to various embodiments.

FIG. 3 is a diagram illustrating an example of a connection between a RIC and multiple O-CU-CPs, O-CU-UPs, and O-DUs within the O-RAN system according to various embodiments.

Referring to FIG. 3, an RIC 300 may be connected to multiple O-CU-CPs 320, O-CU-UPs 310, and O-DUs 330.

An interface between the RIC 300 and the O-DU 330 may be defined as an E2-DU 340. An interface between the RIC 300 and the O-CU-CP 320 may be defined as an E2-CP 350. An interface between the RIC 300 and the O-CU-UP 310 may be defined as an E2-UP 360.

An interface between the O-CU-CP 320 and the O-DU 330 may be defined as F1. An interface between the O-CU-UP 310 and the O-DU 330 may be defined as an F1 370.

One RIC 300 has been illustrated in FIG. 3, but an O-RAN system may be implemented to include a plurality of RICs. The plurality of RICs may be implemented as a plurality of pieces of hardware disposed at the same physical location or may be implemented through virtualization using one piece of hardware.

Figure 4A:
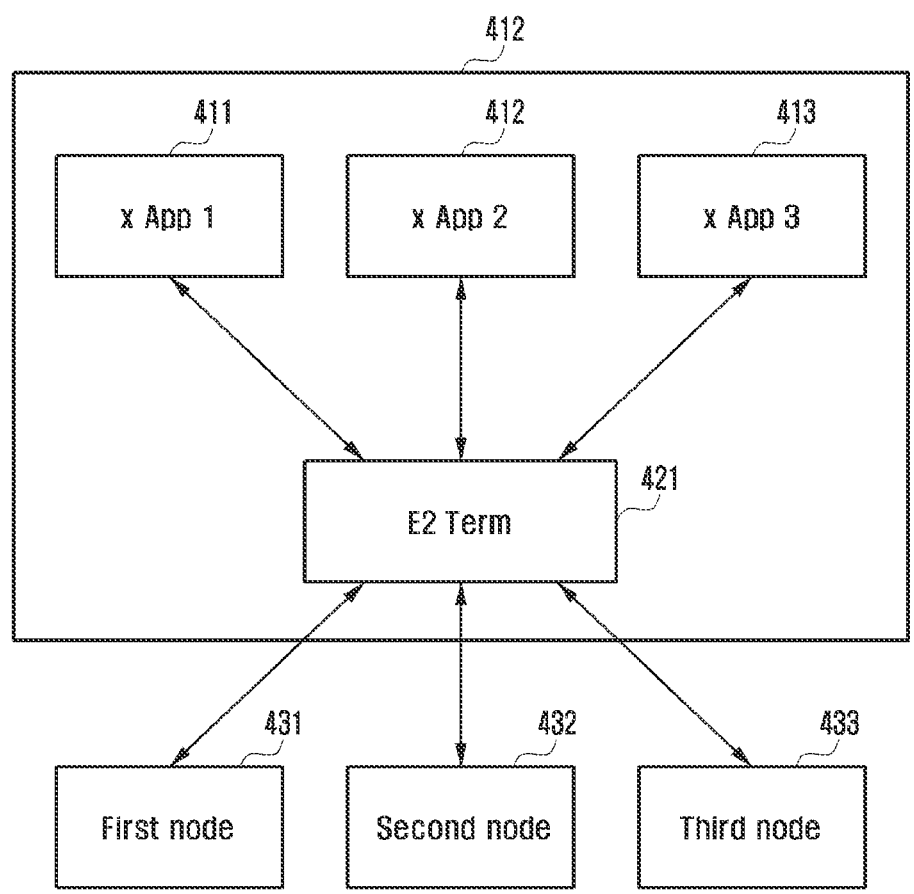
FIG. 4A is a block diagram illustrating an example configuration of an electronic device according to various embodiments.

FIG. 4A is a block diagram illustrating an example configuration of an electronic device according to various embodiments.

Referring to FIG. 4A, an electronic device 400 (e.g., the RIC 300 in FIG. 3) may include a plurality of applications including a first application 411, a second application 412 and/or a third application 413, and an E2 termination 421 connected between the applications and nodes (e.g., a first node 431, a second node 432 and/or a third node 433).

According to various embodiments of the present disclosure, the application 410 may be an element which is implemented within the electronic device 400 and performs various functions. The application 410 may perform various functions based on information (e.g., information related to a UE (e.g., the UE 120 in FIG. 1) connected to a first node 431, a second node 432 and/or a third node 433) transmitted by the first node 431, the second node 432, or the third node 433.

The first application 411 may transmit, to a subscription manager (not illustrated), a subscription request for receiving data for performing a function which may be provided by the first application 411. The subscription manager may receive destination node (e.g., the first node 431) information included in the subscription request transmitted by the first application 411, and may transmit data to the first node 431 through the E2 termination 421. The subscription manager may transmit, to the first application 411, data transmitted by the first node 431 through the E2 termination 421. The first application 411 may perform various functions using data transmitted by the first node 431 through the E2 termination 421.

The second application 412 may transmit, to the subscription manager (not illustrated), a subscription request for receiving data for performing a function which may be provided by the second application 412. The subscription request may include information indicative of a destination node and/or information indicative of the type of data (or a service type), that is, a target of subscription. The subscription manager may receive destination node (e.g., the second node 432) information included in the subscription request transmitted by the second application 412, and may transmit data to the second node 432 through the E2 termination 421. The subscription manager may transmit, to the second application 412, data transmitted by the second node 432 through the E2 termination 421. The second application 412 may perform various functions using data transmitted by the second node 432 through the E2 termination 421.

The third application 413 may transmit, to the subscription manager (not illustrated), a subscription request for receiving data for performing a function which may be provided by the third application 413. The subscription manager may receive destination node (e.g., the third node 433) information included in the subscription request transmitted by the third application 413, and may transmit data to the third node 433 through the E2 termination 421. The subscription manager may transmit, to the third application 413, data transmitted by the third node 433 through the E2 termination 421. The second application 413 may perform various functions using data transmitted by the third node 433 through the E2 termination 421.

According to various embodiments of the present disclosure, the E2 termination 421 may be an entity that performs the transmission, reception and/or processing of data through an E2 interface implemented in an open RAN system. The data may be data implemented according to a method defined in the E2 interface. The E2 termination 421 may process data transmitted by nodes, and may transmit the processed data to an application. The E2 termination 421 may transmit data to the first node 431, the second node 432 and/or the third node 433, and may transmit data, transmitted by the first node 431, the second node 432 and/or the third node 433, to respective applications (e.g., the first application 411, the second application 412 and/or the third application 413).

The first node 431, the second node 432 and/or the third node 433 may, for example, be any one of the O-CU-CP 320, the O-CU-UP 310 or the O-DU 330 illustrated in FIG. 3.

In the electronic device 400, as the number of nodes, for example, targets subscribed by an application, is increased, the amount (or traffic) of data transmitted through the E2 termination 421 may be increased. As traffic increases, a load of the E2 termination 421 may be increased. A delay time of a function performed by the first application 411, the second application 412 and/or the third application 413 may be increased due to the processing time of data received through the E2 termination 421.

Figure 4B:
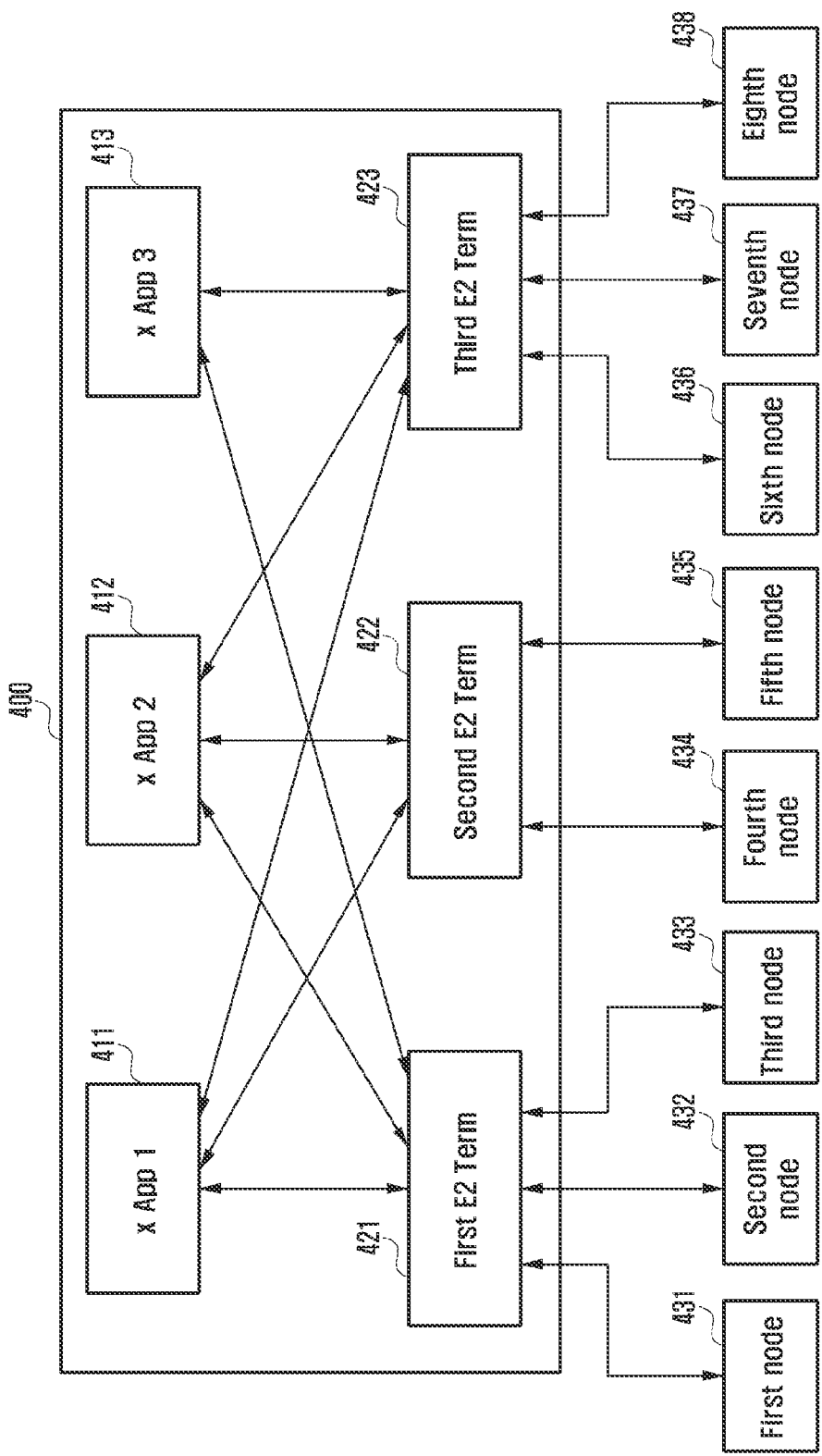
FIG. 4B is a block diagram illustrating an example in which an electronic device receives data from a plurality of nodes through a plurality of E2 terminations according to various embodiments.

FIG. 4B is a block diagram illustrating an example configuration of the electronic device according to various embodiments.

Referring to FIG. 4B, an electronic device 400 (e.g., the RIC 300 in FIG. 3) may include a plurality of applications including a first application 411, a second application 412 and/or a third application 413, and a first E2 termination 421, a second E2 termination 422 and/or a third E2 termination 423 connected between the applications and nodes (e.g., a first node 431, a second node 432, a third node 433, a fourth node 434, a fifth node 435, a sixth node 436, a seventh node 437, an eighth node 438 and/or a ninth node 439).

In the description with reference to FIG. 4B, some of a description of an element redundant with that of FIG. 4A may not be repeated here.

The electronic device 400 may implement a plurality of E2 terminations for a connection with more nodes. Referring to FIG. 4B, the electronic device 400 may include the first E2 termination 421, the second E2 termination 422 and/or the third E2 termination 423.

For convenience of description, it is assumed that the first E2 termination 421 is connected to the first node 431, the second node 432 and/or the third node 433, the second E2 termination 422 is connected to the fourth node 434 and/or the fifth node 435, and the third E2 termination 423 is connected to the sixth node 436, the seventh node 437 and/or the eighth node 438. Furthermore, it is assumed that the first node 431, the fourth node 434 and/or the eighth node 438 transmit, to the electronic device 400, data for a first function provided by the first application 411, the second node 432, the fifth node 435 and/or the sixth node 436 transmit, to the electronic device 400, data for a second function provided by the second application 412, and the third node 433 and/or the seventh node 437 transmit, to the electronic device 400, data for a third function provided by the third application 413.

The electronic device 400 may receive a subscription request for performing the first function from the first application 411 capable of performing the first function. The subscription request may include information indicative of a destination node (e.g., the first node 431, the fourth node 434 and/or the eighth node 438) and/or information indicative of the type of data (or a service type). The electronic device 400 may transmit, to the first application 411, data transmitted by the first node 431 through the first E2 termination 421, may transmit, to the first application 411, data transmitted by the fourth node 434 through the second E2 termination 422, and may transmit, to the first application 411, data transmitted by the eighth node 438 through the third E2 termination 423. The first application 411 may perform the first function based on the data transmitted by the first node 431, the fourth node 434 and/or the eighth node 438.

The electronic device 400 may receive a subscription request for performing the second function from the second application 412 capable of performing the second function. The subscription request may include information indicative of a destination node (e.g., the second node 432, the fifth node 435 and/or the sixth node 436) and/or information indicative of the type of data (or a service type). The electronic device 400 may transmit, to the second application 412, data transmitted by the second node 432 through the first E2 termination 421, may transmit, to the second application 412, data transmitted by the fifth node 435 through the second E2 termination 422, and may transmit, to the second application 412, data transmitted by the sixth node 436 through the third E2 termination 423. The second application 412 may perform the second function based on the data transmitted by the second node 432, the fifth node 435 and/or the sixth node 436.

The electronic device 400 may receive a subscription request for performing the third function from third application 413 capable of performing the third function. The subscription request may include information indicative of a destination node (e.g., the third node 433 and/or the seventh node 437) and/or information indicative of the type of data (or a service type). The electronic device 400 may transmit, to the third application 413, data transmitted by the third node 433 through the first E2 termination 421, and may transmit, to the third application 413, data transmitted by the seventh node 437 through the third E2 termination 423. The third application 413 may perform the third function based on the data transmitted by the third node 433 and/or the seventh node 437.

Referring to FIG. 4B, it may be seen that the number of data reception paths within the electronic device 400 is increased compared to the number of data reception paths in FIG. 4A. As the number of E2 terminations implemented on the electronic device 400 and the number of nodes connected to the electronic device 400 are increased, the number of data reception paths may be increased. When the number of data reception paths is increased, resources required to control the paths between the applications 411, 412, and 413 and the E2 terminations 421, 422, and 423 may be increased. As the resources required to control the paths are increased, the resources of the electronic device 400 may not be efficiently used, a data processing speed may be reduced, and the stability of data reception may be decreased.

Hereinafter, an example in which connections between an E2 termination (e.g., the first E2 termination 421, the second E2 termination 422 and/or the third E2 termination 423) and a plurality of nodes (e.g., the first node 431, the second node 432, the third node 433, the fourth node 434, the fifth node 435, the sixth node 436, the seventh node 437, the eighth node 438 and/or the ninth node 439) are controlled in order to improve the stability of data reception is described.

Figure 5:
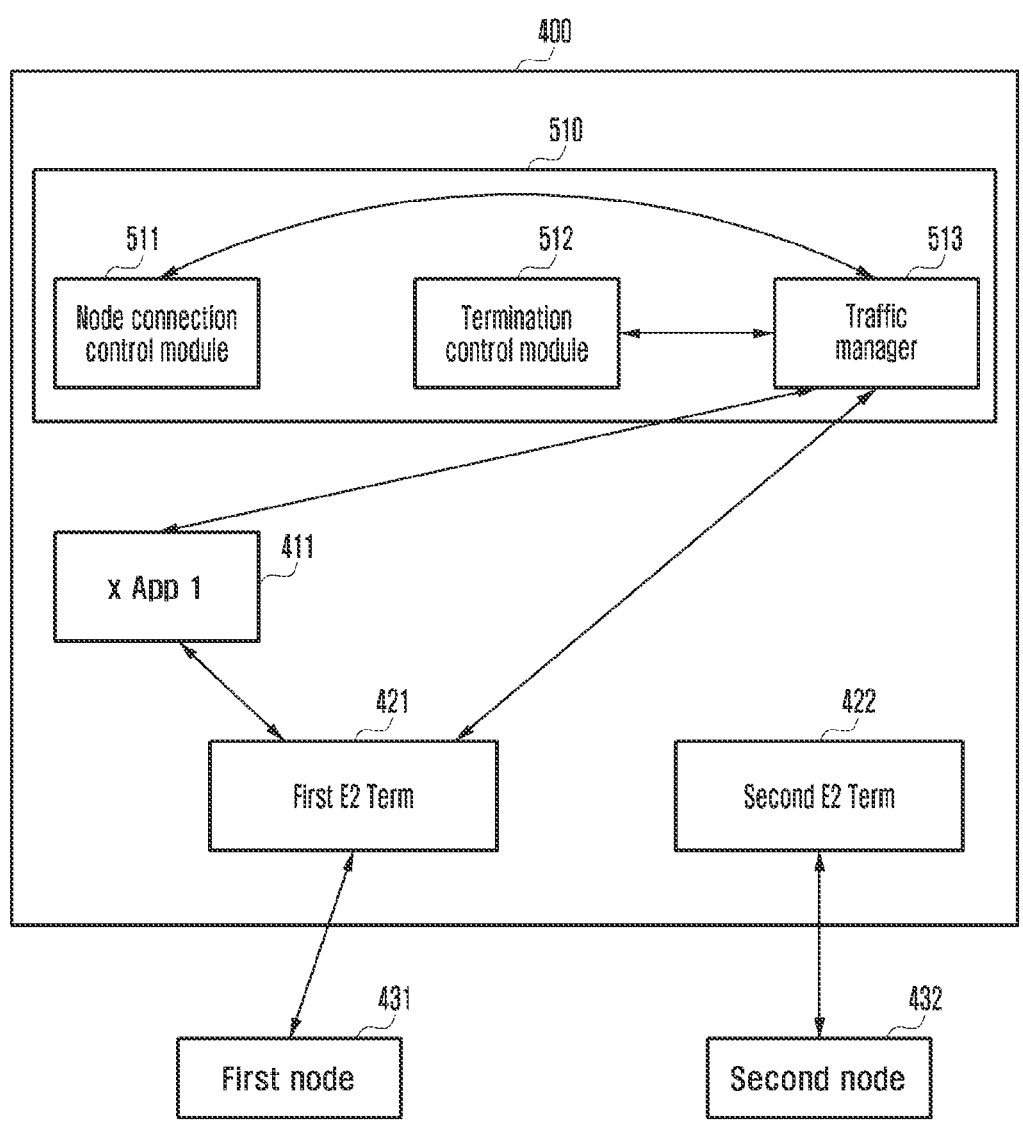
FIG. 5 is a block diagram illustrating an example configuration of an electronic device according to various embodiments.

FIG. 5 is a block diagram illustrating an example configuration of an electronic device according to various embodiments.

Referring to FIG. 5, an electronic device 400 (e.g., the RIC 300 in FIG. 3) may include at least one an application (e.g., the first application 411 in FIG. 4), a plurality of E2 terminations (e.g., the first E2 termination 421, the second E2 termination 422) connected between the application 411 and at least one node (e.g., the first node 431 or the second node 432 in FIG. 4), and a traffic controller (e.g., including various processing circuitry and/or executable program instructions) 510.

According to various embodiments of the present disclosure, the application 411 may be an element which is implemented within the electronic device 400 and performs various functions. The application 411 may perform various functions based on information transmitted by the first node 431 or the second node 432 (e.g., information related to a UE (e.g., the UE 120 in FIG. 1) connected to the first node 431 and the second node 432).

The first E2 termination 421 may identify the size of data received by the first E2 termination 421, and may generate data traffic information based on the identified size. The data traffic information may include the size of data received through the first E2 termination 421 for a designated time. The first E2 termination 421 may generate data traffic information every designated time, and may transmit the generated data traffic information to the traffic controller 510.

The second E2 termination 422 may identify the size of data received by the second E2 termination 422, and may generate data traffic information based on the identified size. The data traffic information may include the size of data received through the second E2 termination 422 for a designated time. The second E2 termination 422 may generate data traffic information every designated time, and may transmit the generated data traffic information to the traffic controller 510.

The traffic controller 510 may be an entity which receives data traffic information monitored by the plurality of E2 terminations 421 and 422 and controls the plurality of E2 terminations 421 and 422 based on the data traffic information. The traffic controller 510 may be an entity implemented on a processor (not illustrated) of the electronic device 400, and may be an entity implemented physically or as software.

The traffic controller 510 may include a node connection control module (e.g., including various processing circuitry and/or executable program instructions) 511 controlling a connection between a plurality of nodes and an E2 termination (e.g., the first E2 termination 421 or the second E2 termination 422), a termination control module (e.g., including various processing circuitry and/or executable program instructions) 512 controlling the activation or deactivation of a plurality of E2 terminations (e.g., the first E2 termination 421 and the second E2 termination 422) and/or a traffic manager (e.g., including various processing circuitry and/or executable program instructions) 513 controlling the node connection control module 511 and/or the termination control module 512 based on data traffic information.

The traffic manager 513 may receive a subscription request from the application 411, and may identify information indicative of a node (e.g., the first node 431) included in the subscription request transmitted by the application 411. The subscription request may be an operation of requesting the electronic device 400 to perform a series of operations for receiving, by the application 411, data requested to perform a specific function from a specific node.

The traffic manager 513 may select an E2 termination to be connected to the first node 431 among the plurality of E2 terminations based on data traffic information. The traffic manager 513 may identify the type of data, that is, a target of subscription, included in a subscription request from the application 411, and may determine the size of traffic to be generated by the subscription of the application 411 based on the type of data. For example, the type of data may include a service type in which data is used and the transmission cycle of the data. For example, a service type may include information of the UE 120 when a connection of a UE (e.g., the UE 120 in FIG. 1) with the first node 431 is detected and/or information indicative of a service that provides information related to a cell configured by the first node 431. Alternatively, a service type may include information indicative of a service providing information that most uses resources provided by the first node 431 among a plurality of UEs connected to the first node 431. The traffic manager 513 may determine the size of traffic to be generated by the subscription of the application 411 based on a transmission cycle and the size of data to be transmitted in the type of data.

The traffic manager 513 may select one of the plurality of E2 terminations based on data traffic information and the determined size of traffic.

The traffic manager 513 may identify whether traffic of the first E2 termination 421 increased due to the subscription of the application 411 exceeds maximum permission traffic of the first E2 termination 421 based on traffic information, and may select the first E2 termination 421 as an E2 termination to be used in the subscription of the application 411 when the increased traffic does not exceed the maximum permission traffic. When the increased traffic exceeds the maximum permission traffic, the traffic manager 513 may select, as an E2 termination to be used in the subscription of the application 411, another E2 termination (e.g., the second E2 termination 422) not the first E2 termination 421. The traffic manager 513 may activate an additional E2 termination (e.g., the second E2 termination 422) based on the identification of the absence of the E2 termination which may be used in the subscription of the application 411 among activated E2 terminations. The traffic manager 513 may control the termination control module 512 to activate the second E2 termination 422 as a part of an operation of activating the E2 termination. The termination control module 512 may activate the second E2 termination 422 based on control of the traffic manager 513.

Although a subscription request from the application 411 is not present, the traffic manager 513 may receive traffic information from an activated E2 termination (e.g., the first E2 termination 421) every designated cycle, and may activate another E2 termination (e.g., the second E2 termination 422) based on the size of traffic of the first E2 termination 421 satisfying a designated condition (e.g., the size of traffic is greater than (or exceeds) maximum permission traffic).

The traffic manager 513 may perform a series of operations for connecting a selected E2 termination (e.g., the first E2 termination 421) and a node (e.g., the first node 431) included in a subscription request transmitted by the application 411. The traffic manager 513 may control the node connection control module 511 to perform a connection between the first E2 termination 421 and the first node 431. The node connection control module 511 may perform the connection between the first E2 termination 421 and the first node 431.

The application 411 may receive data from the first node 431 and perform a specific function of the application 411 based on the data received from the first node 431, as a part of a subscription procedure.

Through the aforementioned example, the electronic device 400 can reduce an increase in the delay time in a way that an E2 termination that will perform subscription is selected and the subscription is performed based on data traffic information, and a plurality of E2 terminations processes proper data traffic.

The traffic manager 513 may deactivate a specific E2 termination based on traffic information. According to an embodiment, the traffic manager 513 may determine to deactivate the first E2 termination 421 based on the size of traffic of the first E2 termination 421 satisfying a designated condition (e.g., the size of traffic is minimum traffic or less (less than minimum traffic)). The traffic manager 513 may control the termination control module 512 to deactivate the first E2 termination 421. The traffic manager 513 may control the node connection control module 511 so that the first node 431 connected to the first E2 termination 421 is connected to another activated termination (e.g., the second E2 termination 422).

The traffic controller 510 may improve the stability of data transmission (or reception) by reducing a data transmission (or reception) path within the electronic device 400. The traffic controller 510 (or the traffic manager 513) may identify the type of data (or a service type) transmitted through an activated E2 terminations. The type of data (or a service type) may be information indicative of an entity (e.g., the application 411) that receives data or information indicative of a function which may be provided by the application 411. The traffic controller 510 may control the node connection control module 511 to connect, to the same E2 termination, nodes that transmit the same data type. The traffic controller 510 may connect the same E2 termination and the application 411 that has requested data subscription. The aforementioned embodiment is described later with reference to FIG. 8.

Figure 6:
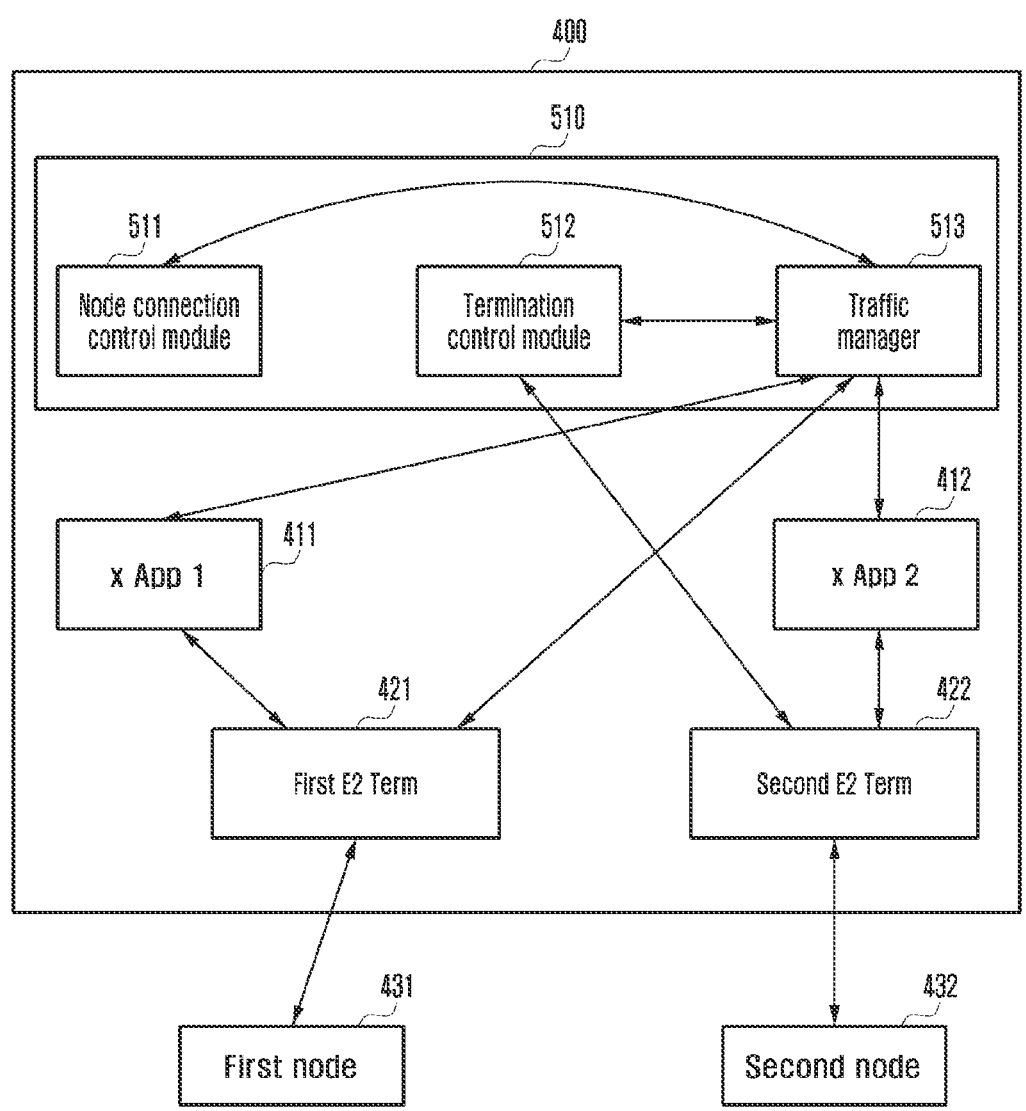
FIG. 6 is a diagram illustrating an example in which an electronic device activates a termination to be connected to an application that has requested subscription based on traffic of data transmitted and received through the termination according to various embodiments.

FIG. 6 is a diagram illustrating an example in which an electronic device activates a termination to be connected to an application that has requested subscription based on traffic of data transmitted and received through the termination according to various embodiments.

Referring to FIG. 6, an electronic device 400 (e.g., the RIC 300 in FIG. 3) may include at least one an application (e.g., the first application 411 or the second application 412), a plurality of E2 terminations (e.g., the first E2 termination 421 and the second E2 termination 422) connected between the application 411 and 412 and at least one node (e.g., the first node 431 or the second node 432 in FIG. 4), and a traffic controller 510.

According to various embodiments of the present disclosure, the application 411 may be an element which is implemented within the electronic device 400 and performs various functions. The application 411 may perform various functions based on information (e.g., information related to a UE (e.g., the UE 120 in FIG. 1) connected to the first node 431 and the second node 432) transmitted by the first node 431 or the second node 432.

The first E2 termination 421 may identify the size of data received by the first E2 termination 421 for a designated time, and may generate data traffic information based on the identified size. The data traffic information may include the size of data received through the first E2 termination 421 for a designated time. The first E2 termination 421 may generate data traffic information every designated time, and may transmit the generated data traffic information to the traffic controller 510. In FIG. 6, it is assumed that the first application 411 receives data from the first node 431 through the first E2 termination 421, for convenience of description.

The second E2 termination 422 may identify the size of data received by the second E2 termination 422 for a designated time, and may generate data traffic information based on the identified size. The data traffic information may include the size of data received through the second E2 termination 422 for a designated time. The second E2 termination 422 may generate data traffic information every designated time, and may transmit the generated data traffic information to the traffic controller 510.

The traffic controller 510 may be an entity which receives data traffic information monitored by the plurality of E2 terminations 421 and 422 and controls the plurality of E2 terminations 421 and 422 based on the data traffic information. The traffic controller 510 is an entity implemented on a processor (not illustrated) of the electronic device 400, and may be an entity implemented physically or as software. For example, the traffic controller 510 may include various processing circuitry and/or executable program instructions.

The traffic controller 510 may include a node connection control module 511 controlling a connection between a plurality of nodes and E2 terminations (e.g., the first E2 termination 421 and the second E2 termination 422), a termination control module 512 controlling the activation or deactivation of the plurality of E2 terminations (e.g., the first E2 termination 421 and the second E2 termination 422) and/or a traffic manager 513 controlling the node connection control module 511 and/or the termination control module 512 based on data traffic information.

The traffic manager 513 may receive a subscription request from the second application 412, and may identify information indicative of a node (e.g., the second node 432) included in the subscription request transmitted by the second application 412.

The traffic manager 513 may select an E2 termination to be connected to the second node 432 among the plurality of E2 terminations based on data traffic information. The traffic manager 513 may identify the type of data, that is, a target of subscription included in a subscription request from the second application 412, and may determine the size of traffic to be generated by the subscription of the second application 412 based on the type of data. The traffic manager 513 may select one of the plurality of E2 terminations based on the data traffic information and the determined size of traffic.

The traffic manager 513 may select, as an E2 termination to be used in the subscription of the second application 412, another E2 termination (e.g., the second E2 termination 422) not the first E2 termination 421 when increased traffic exceeds maximum permission traffic.

The traffic manager 513 may perform a series of operations for connecting a selected E2 termination (e.g., the second E2 termination 422) and a node (e.g., the second node 432) included in a subscription request transmitted by the second application 412. The traffic manager 513 may control the node connection control module 511 to perform the connection between the second E2 termination 422 and the second node 432. The node connection control module 511 may perform the connection between the second E2 termination 422 and the second node 432.

The second application 412 may receive data from the second node 432 and perform a specific function of the application 411 based on the data received from the second node 432, as a part of a subscription procedure.

Figure 7:
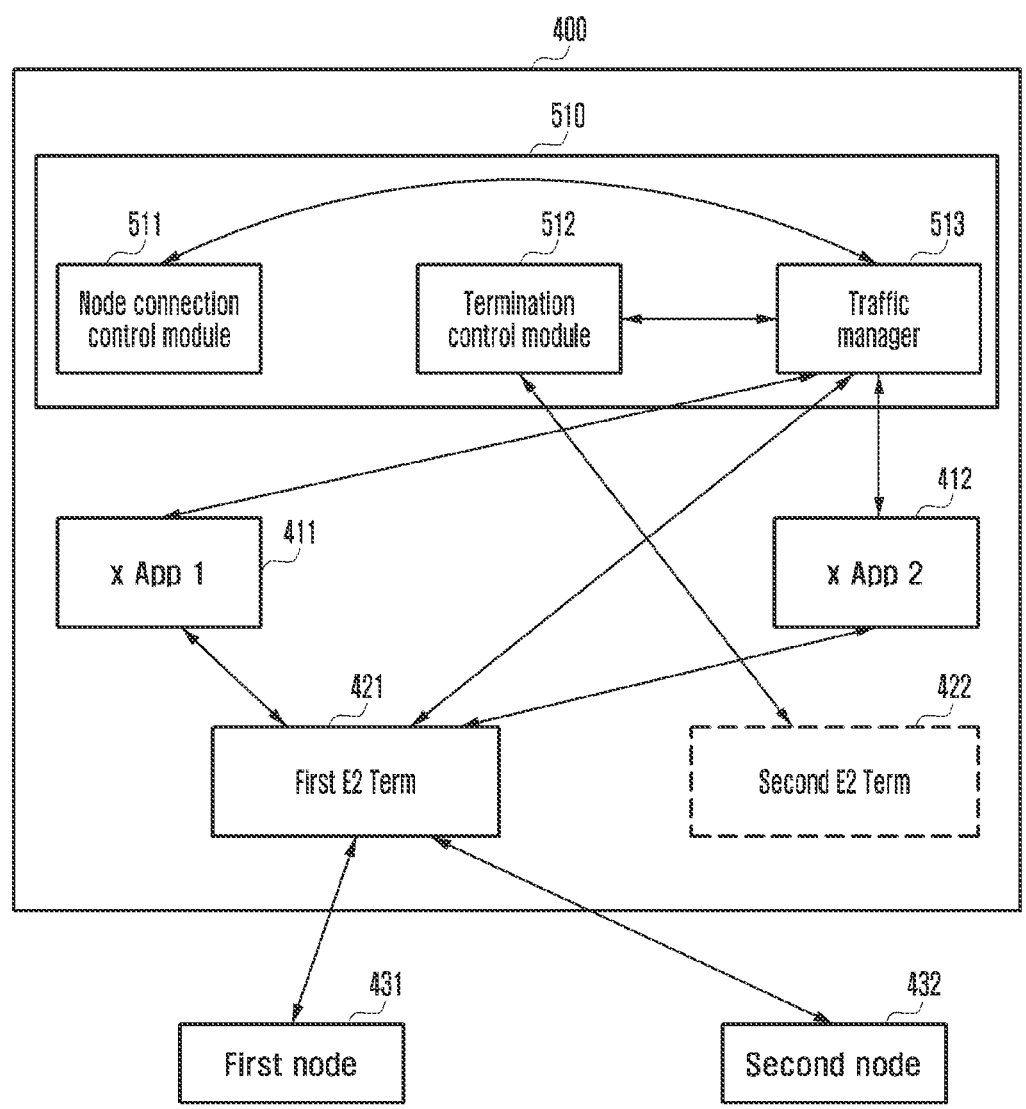
FIG. 7 is a diagram illustrating an example in which an electronic device deactivates a termination based on traffic of data transmitted and received through the termination according to various embodiments.

FIG. 7 is a diagram illustrating an example in which an electronic device deactivates a termination based on traffic of data transmitted and received through the termination according to various embodiments.

Referring to FIG. 7, an electronic device 400 (e.g., the RIC 300 in FIG. 3) may include at least one application (e.g., the first application 411 or the second application 412), a plurality of E2 terminations (e.g., the first E2 termination 421 and the second E2 termination 422) connected between the application 411 and 412 and at least one node (e.g., the first node 431 or the second node 432 in FIG. 4), and a traffic controller (e.g., including various processing circuitry and/or executable program instructions) 510.

According to various embodiments of the present disclosure, the application 411 may be an element implemented within the electronic device 400 and performing various functions. The application 411 may perform various functions based on information transmitted by the first node 431 or the second node 432 (e.g., information related to a UE (e.g., the UE 120 in FIG. 1) connected to the first node 431 and the second node 432).

The first E2 termination 421 may identify the size of data received by the first E2 termination 421 for a designated time, and may generate data traffic information based on the identified size. The data traffic information may include the size of data received through the first E2 termination 421 for a designated time. The first E2 termination 421 may generate data traffic information every designated time, and may transmit the generated data traffic information to the traffic controller 510.

The second E2 termination 422 may identify the size of data received by the second E2 termination 422 for a designated time, and may generate data traffic information based on the identified size. The data traffic information may include the size of data received through the second E2 termination 422 for a designated time. The second E2 termination 422 may generate data traffic information every designated time, and may transmit the generated data traffic information to the traffic controller 510. In FIG. 7, it is assumed that the first application 411 receives data from the first node 431 through the first E2 termination 421 and the second application 412 receives data from the second node 432 through the second E2 termination 422, for convenience of description.

The traffic controller 510 may be an entity which receives data traffic information monitored by the plurality of E2 terminations 421 and 422 and controls the plurality of E2 terminations 421 and 422 based on the data traffic information. The traffic controller 510 is an entity implemented on a processor (not illustrated) of the electronic device 400, and may be an entity implemented physically or as software.

The traffic controller 510 may include a node connection control module 511 controlling a connection between a plurality of nodes and E2 terminations (e.g., the first E2 termination 421 an d the second E2 termination 422), a termination control module 512 controlling the activation or deactivation of a plurality of E2 terminations (e.g., the first E2 termination 421 and the second E2 termination 422) and/or a traffic manager 513 controlling the node connection control module 511 and/or the termination control module 512 based on data traffic information.

The traffic manager 513 may deactivate a specific E2 termination based on traffic information. According to an embodiment, the traffic manager 513 may determine to deactivate the second E2 termination 422 based on the size of traffic of the second E2 termination 422 satisfying a designated condition (e.g., the size of traffic is minimum traffic or less (less than minimum traffic)). The traffic manager 513 may control the termination control module 512 to deactivate the second E2 termination 422. The traffic manager 513 may control the node connection control module 511 so that the second node 432 connected to the second E2 termination 422 is connected to another activated termination (e.g., the first E2 termination 421).

Figure 8:
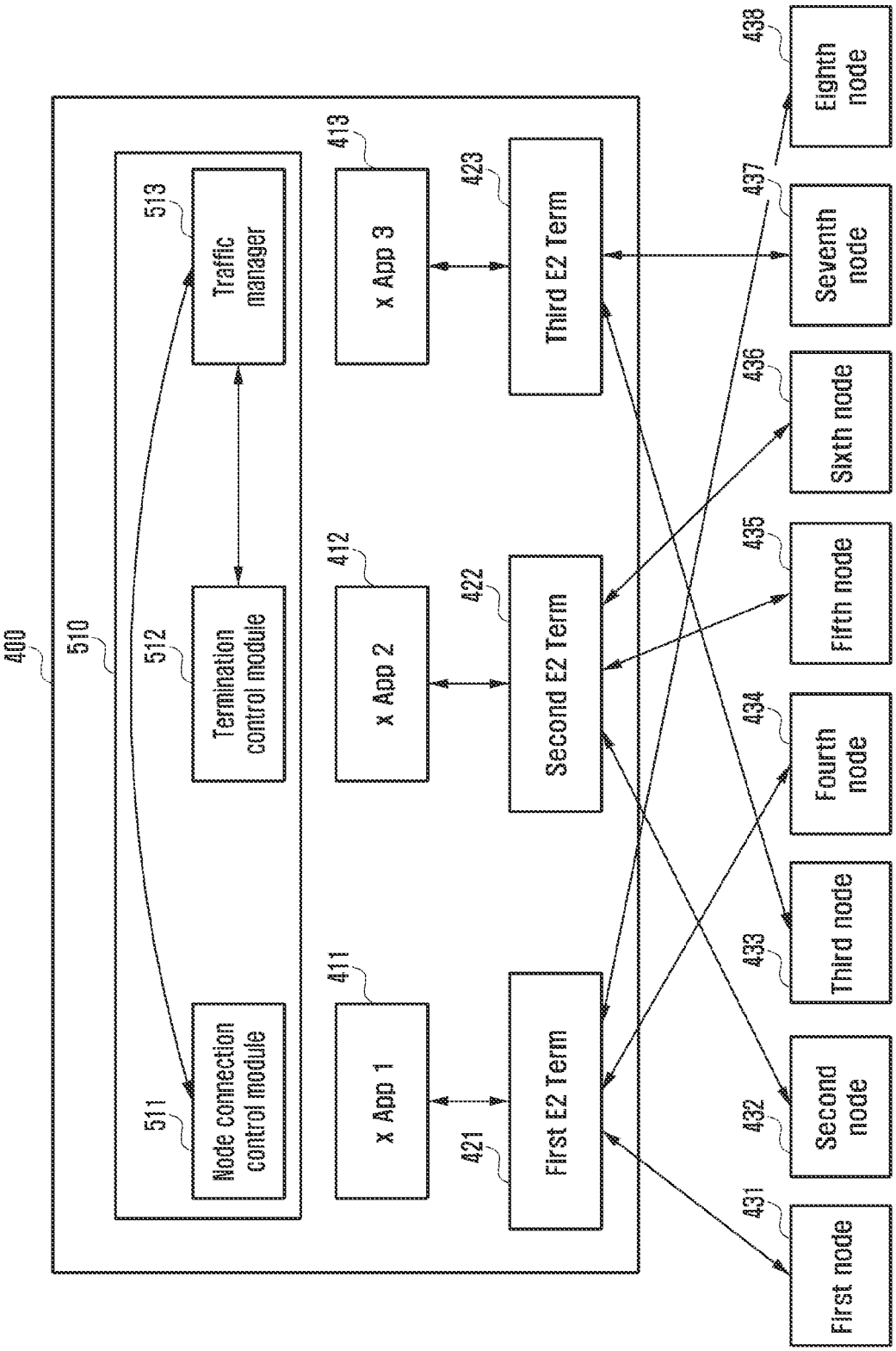
FIG. 8 is a diagram illustrating an example in which in which an electronic device changes a termination to be connected to a node based on the type of data (or a service type) transmitted and received through the termination according to various embodiments.

FIG. 8 is a diagram illustrating an example in which an electronic device changes a termination to be connected to a node based on the type of data (or a service type) transmitted and received through the termination according to various embodiments.

With reference to FIG. 8, an electronic device 400 (e.g., the RIC 300 in FIG. 3) may include a plurality of applications including a first application 411, a second application 412 and/or a third application 413, a first E2 termination 421, a second E2 termination 422 and/or a third E2 termination 423 connected between the applications and nodes (e.g., a first node 431, a second node 432, a third node 433, a fourth node 434, a fifth node 435, a sixth node 436, a seventh node 437, an eighth node 438 and/or a ninth node 439) and/or a traffic manager (e.g., including various processing circuitry and/or executable program instructions) 510.

For convenience of description, it is assumed that the first node 431, the fourth node 434 and/or the eighth node 438 transmit, to the electronic device 400, data for a first function provided by the first application 411, the second node 432, the fifth node 435 and/or the sixth node 436 transmit, to the electronic device 400, data for a second function provided by the second application 412, and the third node 433 and/or the seventh node 437 transmit, to the electronic device 400, data for a third function provided by the third application 413.

The traffic controller 510 can improve the stability of data transmission (or reception) by reducing a data transmission (or reception) path within the electronic device 400. The traffic controller 510 (or the traffic manager 513) may identify the type of data (or a service type) transmitted through activated E2 terminations. The type of data (or a service type) may be information indicative of an entity (e.g., the application 411) that receives data or information indicative of a function which may be provided by the application 411. For example, information related to the first function performed by the first application 411 may refer, for example, to a first data type (or a first service type). Information related to the second function performed by the second application 412 may refer, for example, to a second data type (or a second service type). Information related to the third function performed by the third application 413 may refer, for example, to a third data type (or a third service type). In this case, the type of data transmitted by the first node 431, the fourth node 434 and/or the eighth node 438 may be the first data type. The type of data transmitted by the second node 432, the fifth node 435 and/or the sixth node 436 may be the second data type. The type of data transmitted by the third node 433 and the seventh node 437 may be the third data type.

The traffic controller 510 may control the node connection control module 511 to connect, to the same E2 termination, nodes that transmit the same data type.

The traffic controller 510 may control the node connection control module 511 so that nodes (e.g., the first node 431, the fourth node 434, and the eighth node 438) that transmit the first data type are connected to the first E2 termination 421, that is, the same E2 termination.

The traffic controller 510 may control the node connection control module 511 so that nodes (e.g., the second node 432, the fifth node 435, and the sixth node 436) that transmit the second data type are connected to the second E2 termination 422, that is, the same E2 termination.

The traffic controller 510 may control the node connection control module 511 so that nodes (e.g., the third node 433, the seventh node 437) that transmit the third data type are connected to the third E2 termination 423, that is, the same E2 termination.

With reference to FIG. 8, the first E2 termination 421 may transmit data to the first application 411, and may not perform the transmission of data to other applications (e.g., the second application 412 and the third application 413). Accordingly, a data transmission path between the first E2 termination 421 and the second application 412 and a data transmission path between the first E2 termination 421 and the third application 413 may be omitted.

With reference to FIG. 8, the second E2 termination 422 may transmit data to the second application 412, and may not perform the transmission of data to other applications (e.g., the first application 411 and the third application 413). Accordingly, a data transmission path between the second E2 termination 422 and the first application 411 and a data transmission path between the second E2 termination 422 and the third application 413 may be omitted.

With reference to FIG. 8, the third E2 termination 423 may transmit data to the third application 413, and may not perform the transmission of data to other applications (e.g., the first application 411 and the second application 412). Accordingly, a data transmission path between the third E2 termination 423 and the first application 411 and a data transmission path between the third E2 termination 423 and the second application 412 may be omitted.

As in the aforementioned example, the electronic device 400 connects, to the same E2 termination, nodes that transmit the same data type. A data transmission path within the electronic device 400 can be reduced compared to the embodiment of FIG. 4B, and the stability of data reception (or transmission) can be improved.

According to an embodiment, the electronic device 400 may determine an E2 node to be connected to a node based on a characteristic of data. The electronic device 400 may connect a node that transmits data having higher priority than other data to an E2 termination having a relatively low load. The electronic device 400 may connect a node that transmits data having a larger size than other data to an E2 termination having a relatively low load. The electronic device 400 may connect a node having a shorter transmission cycle of data than another node to an E2 termination having a relatively low load.

An electronic device according to various example embodiments of the present disclosure may include: a radio access network (RAN) intelligent controller (RIC) connected to at least one E2 node. The RIC may include: an application; a plurality of E2 terminations connected between at least one node and the application; and a traffic controller. The traffic controller may be configured to: receive a subscription request for the E2 node from the application, may select an E2 termination to be used for the application to perform subscription among the plurality of E2 terminations based on traffic information of data transmitted or received through the E2 termination, and control the application to receive data through the E2 node, through the selected E2 termination.

In an electronic device according to various example embodiments of the present disclosure, the traffic controller may be configured to: activate another E2 termination based on the identification of the amount of traffic of an E2 termination satisfying a designated condition; and connect the another E2 termination and a node.

In an electronic device according to various example embodiments of the present disclosure, the traffic controller may be configured to: deactivate an E2 termination based on the identification of the amount of traffic of the E2 termination satisfying a designated condition; and connect, to another E2 termination, a node connected to the deactivated E2 termination.

In an electronic device according to various example embodiments of the present disclosure, the traffic controller may be configured to: determine the amount of traffic to be generated by an application based on the type of data to be subscribed by the application included in a subscription request; and select an E2 termination to be connected to the application based on the determined amount of traffic.

In an electronic device according to various example embodiments of the present disclosure, the traffic controller may be configured to: identify a service type provided by at least one node; and connect, to the same E2 termination, nodes that provide the same service.

In an electronic device according to various example embodiments of the present disclosure, the traffic controller may be configured to: connect, to the same E2 termination, an application that has requested subscription corresponding to the service type.

In an electronic device according to various example embodiments of the present disclosure, the plurality of E2 terminations may be configured to periodically transmit the traffic information to the traffic controller.

In an electronic device according to various example embodiments of the present disclosure, the traffic controller may include the node connection control module configured to control a connection between the node and an E2 termination; the termination control module configured to control an operation related to the activation of the E2 termination; and the traffic manager configured to control the node connection control module and the termination control module.

In an electronic device according to various example embodiments of the present disclosure, the termination control module may be configured to: determine whether to activate or deactivate at least some of the plurality of E2 terminations based on traffic information received from the traffic manager.

In an electronic device according to various example embodiments of the present disclosure, the traffic manager may be configured to: select an E2 termination to which the application will be connected based on traffic information received from the E2 termination; and control the node connection control module to connect the selected E2 termination and a node.

Figure 9:
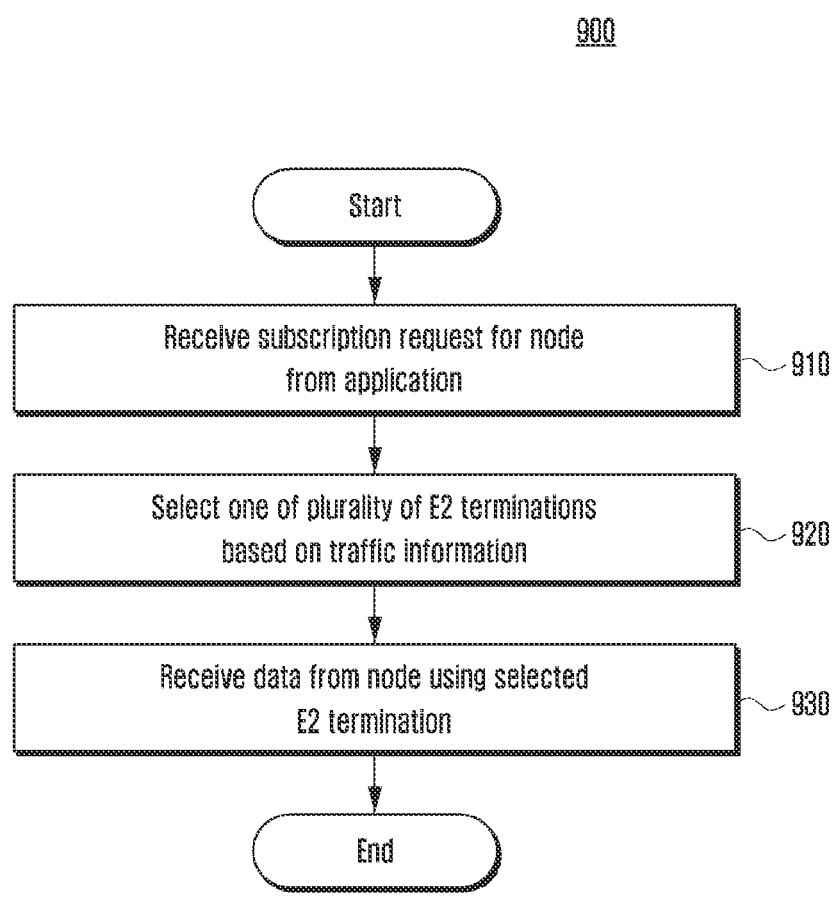
FIG. 9 is a flowchart illustrating an example method of operating an electronic device according to various embodiments.

FIG. 9 is a flowchart illustrating an example method of operating an electronic device according to various embodiments.

Referring to FIG. 9, at operation 910, an electronic device (e.g., the electronic device 400 in FIG. 5) may receive a subscription request for a node (e.g., the first node 431 in FIG. 5) from an application (e.g., the application 411 in FIG. 5).

The subscription request may be an operation of requesting the electronic device 400 to perform a series of operations for receiving, by the application 411, data requested to perform a specific function from a specific node.

The electronic device 400 may receive a subscription request from the application 411, and may identify information indicative of a node (e.g., the first node 431) included in the subscription request transmitted by the application 411.

At operation 920, the electronic device 400 may select one of a plurality of E2 terminations (e.g., the first E2 termination 421 and the second E2 termination 422 in FIG. 5) based on traffic information.

The electronic device 400 may identify the type of data, that is, a target of subscription included in the subscription request of the application 411, and may determine the size of traffic to be generated by the subscription of the application 411 based on the type of data. The electronic device 400 may select one of the plurality of E2 terminations based on data traffic information and the determined size of traffic.

The electronic device 400 may identify whether traffic of the first E2 termination 421 increased due to the subscription of the application 411 exceeds maximum permission traffic of the first E2 termination 421 based on traffic information, and may select the first E2 termination 421 as an E2 termination to be used in the subscription of the application 411 when the increased traffic does not exceed the maximum permission traffic. The electronic device 400 may select another E2 termination (e.g., the second E2 termination 422) not the first E2 termination 421 as an E2 termination to be used in the subscription of the application 411 when the increased traffic exceeds the maximum permission traffic. The electronic device 400 may activate an additional E2 termination (e.g., the second E2 termination 422) based on the identification of the absence of an E2 termination which may be used in the subscription of the application 411 among activated E2 terminations. The electronic device 400 may control the termination control module 512 to activate the second E2 termination 422 as a part of an operation of activating the E2 termination. The termination control module 512 may activate the second E2 termination 422 based on control of the traffic manager 513.

At operation 930, the electronic device 400 may receive data from a node (e.g., the first node 431) using the selected E2 termination.

The electronic device 400 may perform a series of operations for connecting a selected E2 termination (e.g., the first E2 termination 421) and a node (e.g., the first node 431) included in a subscription request transmitted by the application 411. The electronic device 400 may control the node connection control module 511 to perform a connection between the first E2 termination 421 and the first node 431. The node connection control module 511 may perform the connection between the first E2 termination 421 and the first node 431.

The application 411 may receive data from the first node 431 and perform a specific function of the application 411 based on the data received from the first node 431, as a part of a subscription procedure.

Through the aforementioned embodiment, the electronic device 400 selects an E2 termination that will perform subscription and performs subscription based on data traffic information, and can reduce an increase in the delay time because a plurality of E2 terminations processes proper data traffic.

A method of operating the electronic device according to various example embodiments of the present disclosure may include: receiving, by a traffic controller of a radio access network (RAN) intelligent controller (RIC), a subscription request for an E2 node from an application included in the RIC; selecting, by the traffic controller, an E2 termination to be used for the application to perform subscription among a plurality of E2 terminations based on traffic information of data transmitted or received through the E2 termination; and controlling, by the traffic controller, the application to receive data through the node, through the selected E2 termination.

A method of operating the electronic device according to various example embodiments of the present disclosure may further include: =activating another E2 termination based on the identification of the amount of traffic of the E2 termination satisfying a designated condition; and connecting the another E2 termination and the node.

A method of operating the electronic device according to various embodiments of the present disclosure may further include: deactivating the E2 termination based on the identification of the amount of traffic of the E2 termination satisfying a designated condition; and connecting, to another E2 termination, a node connected to the deactivated E2 termination.

A method of operating the electronic device according to various embodiments of the present disclosure may further include: determining the amount of traffic to be generated by the application based on the type of data to be subscribed by the application included in the subscription request; and selecting an E2 termination to be connected to the application based on the determined amount of traffic.

A method of operating the electronic device according to various embodiments of the present disclosure may further include: identifying a service type provided by the at least one node; and connecting, to the same E2 termination, nodes providing the same service.

A method of operating the electronic device according to various embodiments of the present disclosure may further include: connecting, to the same E2 termination, an application that has requested subscription corresponding to the service type.

A method of operating the electronic device according to various embodiments of the present disclosure may further include: periodically transmitting, by the plurality of E2 terminations, the traffic information to the traffic controller.

A method of operating the electronic device according to various embodiments of the present disclosure may further include: determining whether to activate or deactivate at least some of the plurality of E2 terminations based on the traffic information.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "the first" and "the second" or "a first" and "a second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., through wires), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in the form of an application-specific integrated circuit (ASIC).

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in different elements. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any embodiment(s) described herein may be used in conjunction with any other embodiment(s) described herein.

What is claimed is:

1. An electronic device comprising:
   a radio access network (RAN) intelligent controller (RIC) connected to at least one E2 node,
   wherein the RIC comprises:
      an application;
      a plurality of E2 terminations connected between the at least one E2 node and the application; and
      a traffic controller,
   wherein the traffic controller is configured to:
      receive a subscription request for the at least one E2 node from the application,
      receive traffic information of data transmitted or received through each of the plurality of E2 terminations;
      determine whether to activate at least some of the plurality of E2 terminations based on the traffic information;
      select a first E2 termination from among the activated plurality of E2 terminations to be used for the application to perform subscription based on the traffic information; and
      control the application to receive data through the at least one E2 node, through the first E2 termination.

2. The electronic device of claim 1, wherein the traffic controller is configured to:
   activate a second E2 termination from among the plurality of E2 terminations based on identification of an amount of traffic of the first E2 termination satisfying a designated condition, and
   connect the second E2 termination and the at least one E2 node.

3. The electronic device of claim 1, wherein the traffic controller is configured to:
   deactivate the first E2 termination based on identification of an amount of traffic of the first E2 termination satisfying a designated condition, and
   connect, to a second E2 termination, the at least one E2 node connected to the deactivated first E2 termination.

4. The electronic device of claim 1, wherein the traffic controller is configured to:
   determine an amount of traffic to be generated by the application based on a type of data to be subscribed by the application included in the subscription request, and
   select the first E2 termination based on the determined amount of traffic.

5. The electronic device of claim 1, wherein the traffic controller is configured to:
   identify a service type provided by the at least one E2 node, and
   connect, to the first E2 termination, another E2 node different from the at least one E2 node providing an identical service.

6. The electronic device of claim 5, wherein the traffic controller is configured to connect, to the first E2 termination, another application requesting subscription corresponding to the service type.

7. The electronic device of claim 1, wherein the plurality of E2 terminations is configured to periodically transmit the traffic information to the traffic controller.

8. The electronic device of claim 1, wherein the traffic controller comprises:
   a node connection control module comprising circuitry and/or executable program instructions configured to control a connection between the at least one E2 node and the plurality of E2 terminations;
   a termination control module comprising circuitry and/or executable program instructions configured to control an operation related to activation of respective ones of the plurality of E2 terminations; and
   a traffic manager comprising circuitry and/or executable program instructions configured to control the node connection control module and the termination control module.

9. The electronic device of claim 8, wherein the traffic manager is configured to:

control the node connection control module to connect the selected first E2 termination and the at least one E2 node.

10. A method of operating an electronic device, the method comprising:
- receiving, by a traffic controller of a radio access network (RAN) intelligent controller (RIC), a subscription request for at least one E2 node from an application included in the RIC;
- receiving traffic information of data transmitted or received through each of a plurality of E2 terminations;
- determining whether to activate at least some of the plurality of E2 terminations based on the traffic information;
- selecting, by the traffic controller, a first E2 termination from among the activated plurality of E2 terminations to be used for the application to perform subscription based on the traffic information; and
- controlling, by the traffic controller, the application to receive data through the at least one E2 node, through the first E2 termination.

11. The method of claim 10, further comprising:
- activating a second E2 termination from among the plurality of E2 terminations based on identification of an amount of traffic of the first E2 termination satisfying a designated condition, and
- connecting the second E2 termination and the at least one E2 node.

12. The method of claim 10, further comprising:
- deactivating the first E2 termination based on identification of an amount of traffic of the first E2 termination satisfying a designated condition, and
- connecting, to a second E2 termination, the at least one E2 node connected to the deactivated first E2 termination.

13. The method of claim 10, further comprising:
- determining an amount of traffic to be generated by the application based on a type of data to be subscribed by the application included in the subscription request, and
- selecting the first E2 termination based on the determined amount of traffic.

14. The method of claim 10, further comprising:
- identifying a service type provided by the at least one E2 node, and
- connecting, to the first E2 termination, another E2 node different from the at least one E2 node providing an identical service.

15. The method of claim 14, further comprising connecting, to the first E2 termination, another application requesting subscription corresponding to the service type.

16. The method of claim 10, further comprising periodically transmitting, by the plurality of E2 terminations, the traffic information to the traffic controller.

17. The method of claim 10, further comprising determining whether to activate or deactivate at least some of the plurality of E2 terminations based on the traffic information.

18. The electronic device of claim 1, wherein each of the plurality of E2 terminations processes data transmitted from the at least one E2 node and transmits the processed data.

19. The method of claim 10, wherein each of the plurality of E2 terminations processes data transmitted from the at least one E2 node and transmits the processed data.

* * * * *